June 1, 1965            A. ROUX            3,186,569

BOAT AND LUGGAGE CARRIER

Filed Oct. 21, 1963

INVENTOR
André ROUX

By Pierre Lespérance

AGENT 3,186,569
BOAT AND LUGGAGE CARRIER
André Roux, 880 112th Ave., Drummondville South, Quebec, Canada
Filed Oct. 21, 1963, Ser. No. 317,627
3 Claims. (Cl. 214—450)

The present invention relates to an attachment for passenger motor vehicles and, more particularly to a combined luggage and boat carrier for the top of such vehicles.

The general object of the present invention resides in the provision of a vehicle top luggage and boat carrier provided with means for easily loading and unloading the luggage and boat, these operations being carried out at a level close to the ground.

Still another object of the present invention resides in the provision of a combined luggage and boat carrier of the character described, comprising a stationary frame rigidly secured to the top of the motor vehicle and a movable loading and unloading frame, the system being characterized by the fact that in the transport position, the luggage basket or container and the boat rest directly on the stationary frame, the movable frame being free of any load thereon.

Yet another important object of the present invention resides in the provision of a system of the character described, in which the movable frame carries the luggage container or basket and can take an inclined extended position at the side of the motor vehicle, whereby luggage as well as the boat can be loaded at a level much below the top of the motor vehicle.

Yet another object of the present invention resides in the provision of a system of the character described, which is of simple and relatively inexpensive construction and which will have a long service life.

The foregoing and other important objects of the present invention will become more apparent during the following disclosure and by referring to the drawings, in which:

FIGURE 1 is a back end view of a passenger motor vehicle provided with a combined luggage and boat carrier in accordance with the invention and showing the boat and luggage basket or container in transport position, the boat being shown in cross-section, said figure also showing in dot-and-dash lines the loading and unloading position of the movable frame and showing how the boat is loaded or unloaded;

Figure 1:
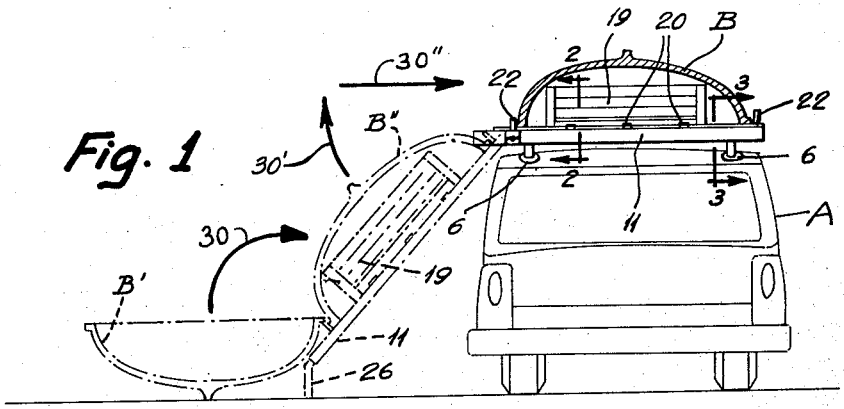

Referring now more particularly to the drawings in which like reference characters indicate like elements throughout, the system in accordance with the invention comprises a rigid stationary frame 1, of generally rectangular shape, and consisting of two spaced parallel rails 2, rigidly interconnected by transverse members 3 near both ends of rails 2, the latter protruding from transverse members 3.

Members 3 have attachment brackets 4 forming eyes through which is inserted and attached one end of straps, not shown, which are provided at their other end with hooks for removably engaging in conventional manner the rain gutter of a motor vehicle A, in order to firmly secure frame 1 unto the top of said vehicle.

Rails 2 are each provided with an angle iron 5 extending longitudinally on the inside thereof and secured thereto. A pair of suction cups 6 are secured to each angle iron 5 and adhere to the top of the motor vehicle A. Thus, frame 1 is supported in horizontal position on the roof of the motor vehicle.

Figure 2:
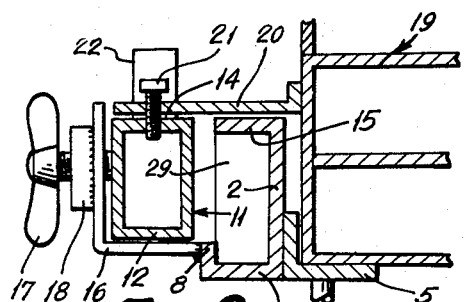
FIGURE 2 is a partial cross-section on an enlarged scale, taken along line 2—2 of FIGURE 1.
Figure 3:
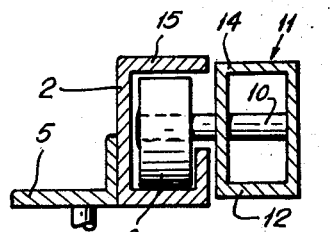
FIGURE 3 is a partial cross-section on an enlarged scale, taken along line 3—3 of FIGURE 1.

Rails 2 have a U-shaped cross-section and are disposed sideways, as shown in FIGURES 2 and 3, with the lower leg 7 provided with an upstanding flange 8.

Lower leg 7 and upper leg 15 of each rail 2 are directed outwardly of frame 1 and each rail 2 receives and guides a roller wheel 9, mounted for free rotation by means of ball bearings or the like on the end of a shaft 10 which is itself secured to a movable frame 11 having a U-shape, consisting of longitudinal legs 12 and a bight member 13.

Figure 4:
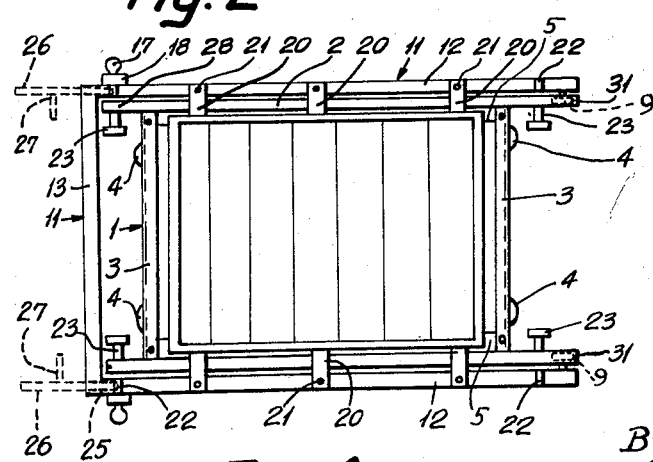
FIGURE 4 is a top plan view of the system in accordance with the invention in transport position.

Roller wheels 9 are mounted at the free ends of the longitudinal tubular legs 12 of movable frame 11, as shown in FIGURE 4, and protrude laterally inwardly thereof.

In transport position, legs 12 of movable frame 11 are disposed on the outside of rails 2 and bight member 13 is disposed outwardly from the free ends 28 of rails 2 of fixed frame 1, at the loading and unloading end of the apparatus.

In the transport position, the top 14 of each leg 12 of movable frame 11 is disposed at a level slightly lower than the top leg 15 of rails 2 of fixed frame 1, as shown in FIGURES 2 and 3.

An L-shaped bracket 16 is secured to flange 8 of each rail 2 of stationary frame 1 near rail ends 28 and protrudes outwardly from said frame 1 and serves to support movable frame 11, as shown in FIGURE 2.

Movable frame 11 is locked in transport position by means of a wing screw 17 passing through a threaded hole made in bracket 16 and in a washer 18 secured to bracket 16.

A luggage receiving basket or container 19, of any conventional construction, is provided with outwardly protruding lateral arms 20, which are removably secured to longitudinal legs 12 of movable frame 11 by means of screws 21.

In transport position, the luggage basket 19 directly rests on angle irons 5, as shown in FIGURE 2, and legs 20 extend over the rails 2 of stationary frame 1 without resting on said rails 2.

Each leg 12 of movable U-shaped frame 11 is provided near its ends with upstanding studs 22, which serve as abutment means for locating a boat B in inverted position, more particularly during loading and unloading of said boat.

Rails 2 of stationary frame 1 are provided at their ends with laterally inwardly protruding headed studs 23 which serve to attach straps passing over boat B to secure said boat in the transport position.

The ends of legs 12 of movable frame 11 adjacent the transverse bight member 13 are provided with bores 25 for removably inserting angular rods 26 provided with inwardly laterally extending arms 27 which serve as handle bars.

The apparatus in accordance with the invention is used and operates in the following manner:

Rods 26 are inserted within bores 25 of legs 12 of movable frame 11 and wing bolts 17 are unscrewed and the movable frame is lifted off L-shaped brackets 16 by grasping handle bars 27.

By pulling on handle bars 27, the movable frame 11 is moved laterally outwardly, the roller wheels 9 moving within rails 2 of fixed frame 1. Roller wheels 9 are moved to the ends 28 of rails 2 until they abut against an end flange 29 (see FIG. 2) closing the loading and unloading ends of the tubular rails 2.

In this limit position of the movable frame 11, the latter extends laterally of the vehicle and can be lowered into an inclined position (shown in dot-and-dash lines in FIGURE 1) with the angular rods 26 resting on the ground.

The luggage container 19, which is secured to the movable frame 11, is in a readily accessible position and can be filled with luggage and other articles, and then the boat B can be loaded on movable frame 11 in the following manner: a boat B is disposed on the ground alongside the movable frame 11, as shown at B', in upright position and then is turned over itself in accordance with arrow 30 to come to rest in inverted position on the movable frame 11 with the sides of the boat engaging the abutment studs 22. The position is now as shown at B".

The movable frame 11 is then lifted in accordance with arrow 30' by means of angular bars 26 and its lateral extensions 27 until said frame assumes an inclined position higher than the level of stationary frame 1. Movable frame 11 is then pushed in the direction of arrow 30" and its roller wheels 9 move along rails 2 until they come into abutment with the closed ends 31 of rails 2, as shown in FIGURE 4.

During this movement, the legs 12 of the movable frame 11 are slightly inclined and thus their top 14 are higher than the top 15 of rails 2.

When movable frame 11 has reached its limit transport position, handle bars 26 are lowered in order to cause the movable frame to rest at its end provided with bight member 13 directly on L-shaped support brackets 16 at the ends 28 of rails 2; wing bolts 17 are then tightened against the movable frame to block the latter in transport position.

In this position, the legs 12 of the movable frame are at a lower level than rails 2 of the stationary frame and, thus, the weight of the luggage carried in basket 19 is directly transferred onto the angle irons 5 secured to the stationary frame 1 and the boat B rests directly on the top 15 of rails 2 of said stationary frame 1. Thus, the frame 11 is no longer subjected to any loading, the weight of the load being directly supported by the fixed frame 1 which is itself firmly secured to the motor vehicle. Thus, roller wheels 9 are not subjected to any wear and the shafts 10 cannot become bent during transport, and load vibration and noise are eliminated.

Once the boat B is in transport position, the latter is firmly attached to frame 1 by means of straps secured at their ends to headed studs 23. The angular rods 26 are removed from the movable frame and stored in the vehicle A.

To unload the boat and luggage, the inverse operations are effected.

While a preferred embodiment in accordance with the present invention has been illustrated and described, it is understood that various modifications may be resorted to without departing from the scope of the appended claims.

What I claim is:

1. A boat carrier for motor vehicles comprising a stationary frame consisting of a pair of spaced parallel rails and of transverse members rigidly interconnecting said rails, means for securing said frame over the top of a motor vehicle with said rails disposed transversely to the longitudinal axis of said motor vehicle, support brackets secured to one end of said rails and laterally extending therefrom, a movable frame of U-shape consisting of longitudinal legs and a transverse bight member interconnecting one end of said legs, said movable frame capable of displacement with respect to said stationary frame between a transport position in which said legs are disposed alongside said rails and said bight member is disposed adjacent said support brackets, and a loading and unloading position in which said movable frame is inclined on one side of said vehicle to receive a boat, support elements secured to the free ends of said legs and laterally extending therefrom and engaging said rails for the support of said free ends of said legs, said support elements being capable of displacement along said rails and being guided by the latter, the other ends of said legs resting directly on said support brackets in the transport position of said movable frame, the top of said legs in said transport position being at a lower level than the top of said rails, whereby a boat in said transport position of said movable frame rests directly on the top of said rails, said movable frame being capable of being lifted off said support brackets and bodily pivoted about said support elements, so as to be raised above said rails, whereby to lift a boat off said rails.

2. A boat carrier as claimed in claim 1, wherein said legs of said movable frame are disposed on the external sides of said rails, said rails having a U-shaped cross-section, the opening defined by its side flanges facing said legs of said movable frame, said support elements consisting of roller wheels carried by the free ends of said legs and disposed within said rails, the shafts on which the roller wheels are mounted being secured to said legs and passing through the opening of said U-shaped rails.

3. A boat carrier as claimed in claim 1, further including means for securing said boat directly to said rails and including anchoring members secured to the ends of each rail.

References Cited by the Examiner

UNITED STATES PATENTS

| | | | |
|---|---|---|---|
| 2,506,421 | 5/50 | Hacker et al. | 214—450 |
| 2,551,351 | 5/51 | Swenson | 214—450 |
| 3,058,636 | 10/62 | Bilbeisi | 214—450 X |

HUGO O. SCHULZ, *Primary Examiner.*